United States Patent [19]

Lardellier

[11] Patent Number: 5,311,736
[45] Date of Patent: May 17, 1994

[54] VARIABLE CYCLE PROPULSION ENGINE FOR SUPERSONIC AIRCRAFT

[75] Inventor: Alain M. J. Lardellier, Melun, France

[73] Assignee: Societe Nationale d'Etude et de Construction de Moteurs d'Aviation "S.N.E.C.M.A.", Paris, France

[21] Appl. No.: 994,914

[22] Filed: Dec. 22, 1992

[30] Foreign Application Priority Data

Dec. 24, 1991 [FR] France ................. 91 16094

[51] Int. Cl.$^5$ ............................................. F02K 3/02
[52] U.S. Cl. .................................... 60/226.3; 60/226.1
[58] Field of Search ............... 60/39.092, 224, 225, 60/226.1, 226.2, 226.3

[56] References Cited

U.S. PATENT DOCUMENTS

| | | | |
|---|---|---|---|
| 3,019,600 | 2/1962 | Peek, Jr. | |
| 4,791,783 | 12/1988 | Neitzel | 60/226.3 |
| 4,922,712 | 5/1990 | Matta et al. | 60/226.2 |
| 5,177,957 | 1/1993 | Grieb | 60/226.1 |

FOREIGN PATENT DOCUMENTS

| | | |
|---|---|---|
| 00766192 | 4/1983 | European Pat. Off. |
| 2012730 | 3/1970 | France |
| 1596420 | 7/1970 | France |
| 2284059 | 4/1976 | France |
| 2296769 | 7/1976 | France |
| 2110762 | 6/1983 | United Kingdom |

*Primary Examiner*—Louis J. Casaregola
*Attorney, Agent, or Firm*—Oblon, Spivak, McClelland, Maier & Neustadt

[57] ABSTRACT

A turbojet propulsion engine for supersonic aircraft has a primary unit including a compressor, a combustion chamber, a turbine which drives the compressor, and an exhaust assembly, and a secondary unit including a compression fan assembly arranged in an annular secondary duct surrounding the primary unit, the fan assembly having at least one stage of rotor blades rigidly connected to the shaft which drives the compressor of the primary unit and is disposed between an upstream stage of fixed inlet guide vanes and a downstream stage of fixed flow straightener vanes, the inlet guide vane stage and the flow straightener vane stage each being associated with an adjuster for adjusting the pitch of the respective vanes.

7 Claims, 3 Drawing Sheets

FIG:1

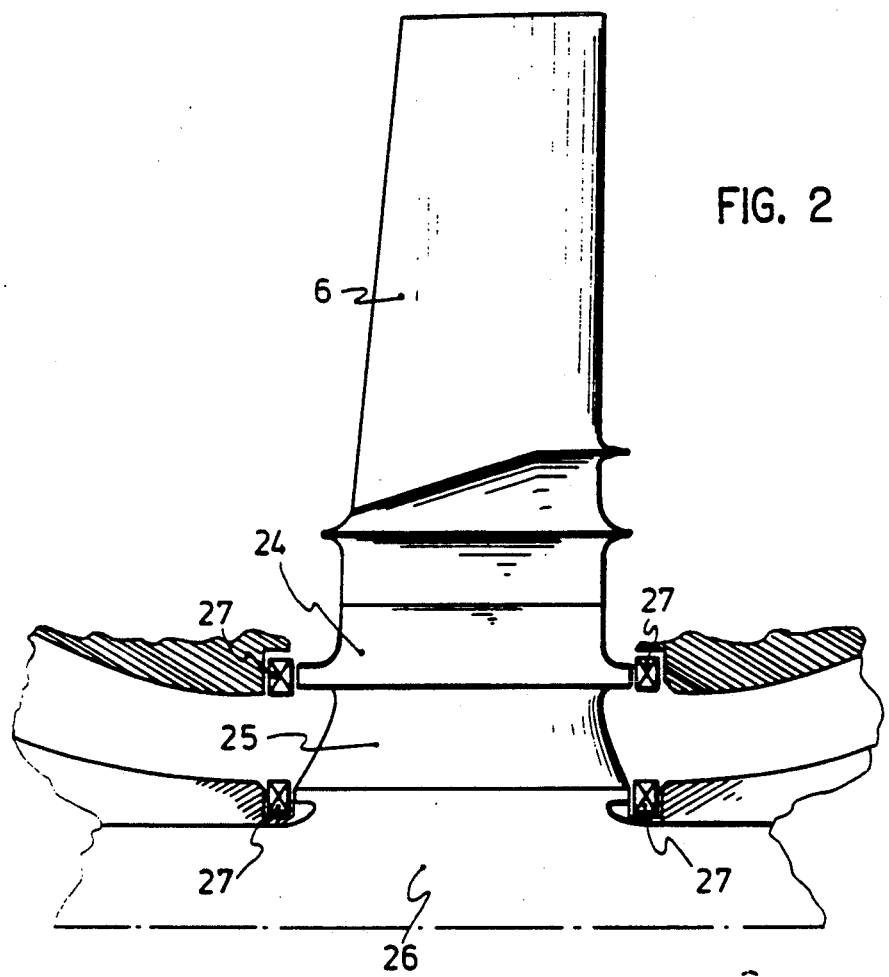
FIG. 2
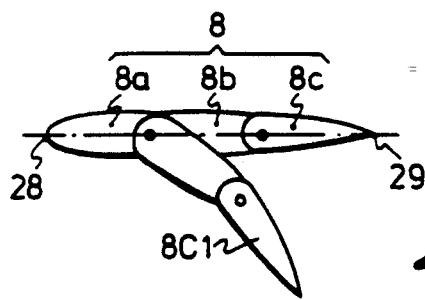
FIG. 3a
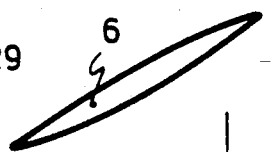
FIG. 3b
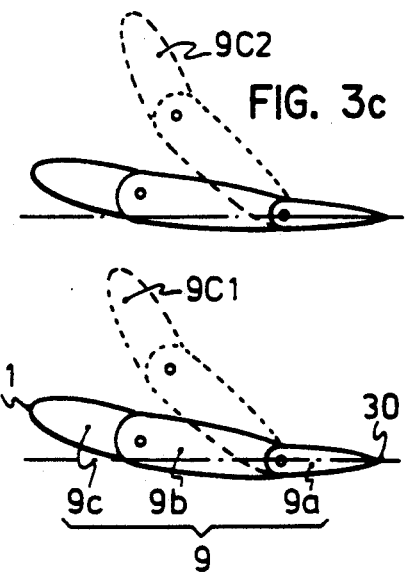
FIG. 3c
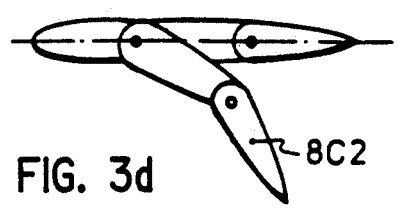
FIG. 3d
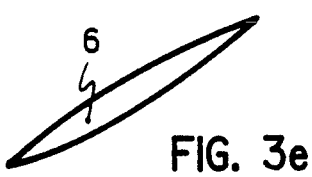
FIG. 3e
FIG. 3f

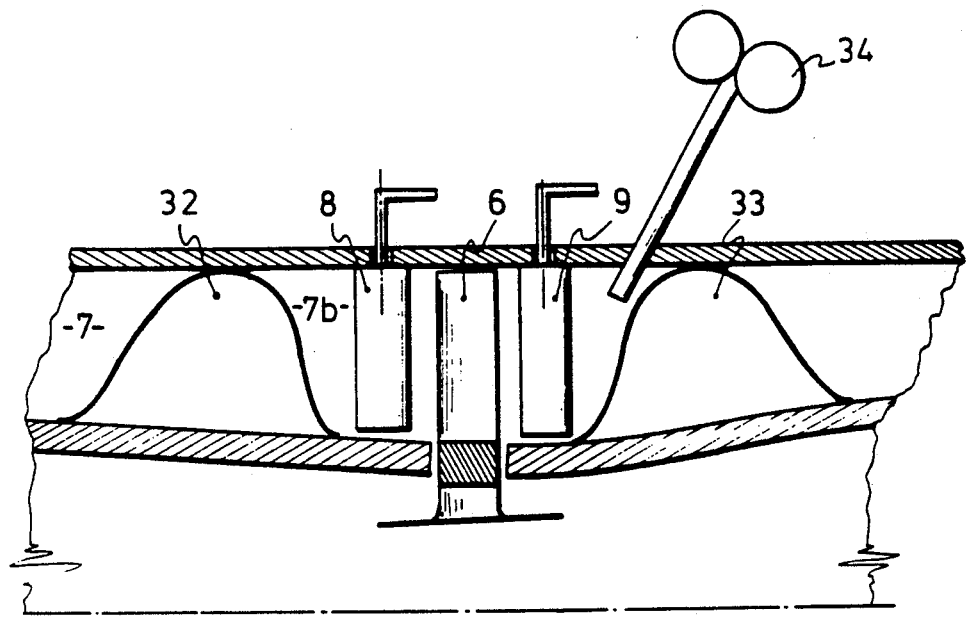
FIG:4
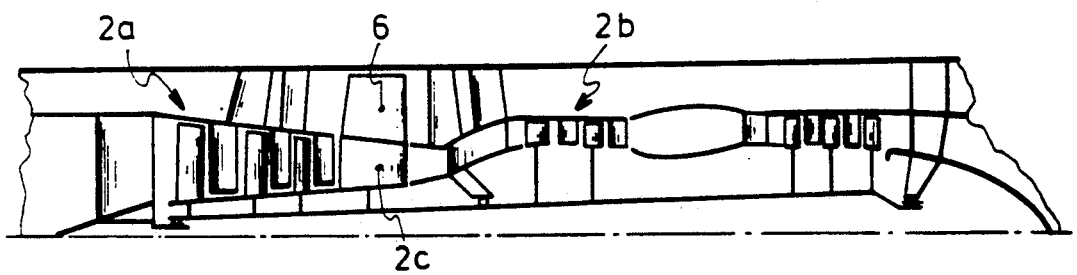
FIG:5

VARIABLE CYCLE PROPULSION ENGINE FOR SUPERSONIC AIRCRAFT

TITLE OF THE INVENTION

The invention relates to an aero-engine which is particularly suitable for supersonic aircraft.

DISCUSSION OF THE BACKGROUND

A development sought in the design of propulsion engines in order to improve their adaptability to the varying operating conditions which occur on a supersonic aircraft depending on the different phases of flight is to provide for a variable operational cycle of the engine. This involves, in particular, reconciling the need to obtain a large thrust per unit flow at supersonic speeds and, consequently, a high ejection velocity for the gases, with the need to reduce this ejection velocity at subsonic speeds, particularly during take-off, in order to limit sound nuisance.

A solution to this problem has already been proposed in EP-A-0 076 192, which involves two connected coaxial propulsive units, an inner one and an outer one. However, this construction comprises two separate combustion chambers and several rotating bodies with concentric shafts, which leads to a fair degree of complexity in manufacture and operation.

SUMMARY OF THE INVENTION

It is an aim of the invention to solve the problem described above by using a much simpler construction.

According to the invention, there is provided a variable cycle turbojet propulsion engine particularly for supersonic aircraft, comprising a primary unit including a compressor, a combustion chamber, a turbine, a common shaft interconnecting said compressor and said turbine whereby said compressor is driven by said turbine, and an exhaust or thrust assembly having at least one adjustable section nozzle, an annular outer casing surrounding said primary unit and defining therebetween an annular cold flow secondary duct, an air intake at the upstream end of said outer casing, a secondary adjustable section ejection nozzle at the downstream end of the said outer casing, and a compression fan assembly disposed in said secondary duct, said fan assembly comprising at least one stage of movable rotor blades rigidly connected to said shaft of said primary unit so as to be driven thereby, a stage of fixed inlet guide vanes on the upstream side of said rotor blade stage, a stage of fixed flow straightener vanes on the downstream side of said rotor blade stage, means for adjusting the pitch of said inlet guide vanes, and means for adjusting the pitch of said fixed flow straightener vanes.

Advantageously, each inlet guide vane of said fan assembly is composed of three parts comprising a fixed upstream part defining a leading edge, and two downstream parts capable of pivoting in an articulated manner so as to adjust their inclination relative to the normal direction of the air flow in said secondary duct, and each flow straightener vane of said fan assembly is composed of three parts comprising a fixed downstream part defining a trailing edge, and two upstream parts capable of pivoting in an articulated manner so as to adjust their inclination relative to the normal direction of the air flow in said secondary duct.

Preferably, the outer casing is provided with at least one peripheral air inlet to said cut upstream of said fan assembly, and means for effecting a temporary closure of said peripheral air inlet, and is also provided with at least one peripheral air discharge outlet from said secondary duct downstream of said fan assembly, and means for effecting temporary closure of said discharge outlet.

In another advantageous embodiment, inflatable bladder means may be provided in the secondary duct both upstream and downstream of the fan assembly, and a vacuum pump provided for evacuating the part of the secondary duct which is between the bladder means and which contains the fan assembly when the bladder means are inflated.

Other preferred features and advantages of the invention will become apparent from the following description of a number of embodiments of the invention, given by way of example with reference to the attached drawings.

BRIEF DESCRIPTION OF THE DRAWINGS

FIG. 2 is a larger scale view of the part ringed by circle II in FIG. 1, showing a rotor blade of the fan assembly of the engine;

FIGS. 3a-3f combine to form a single diagrammatic projectional plan view of part of the fan assembly showing the configurations adopted by the inlet guide vanes and the flow straightener vanes of the assembly in two different phases of operation of the engine.

FIG. 4 is a diagrammatic sectional view, in a plane similar to that of FIG. 1, of part of another embodiment of the engine in accordance with the invention; and, FIG. 5 is a diagrammatic sectional view, in a plane similar to that of FIG. 1, of part of a third embodiment of the engine in accordance with the invention.

DESCRIPTION OF THE PREFERRED EMBODIMENTS

Figure 1:
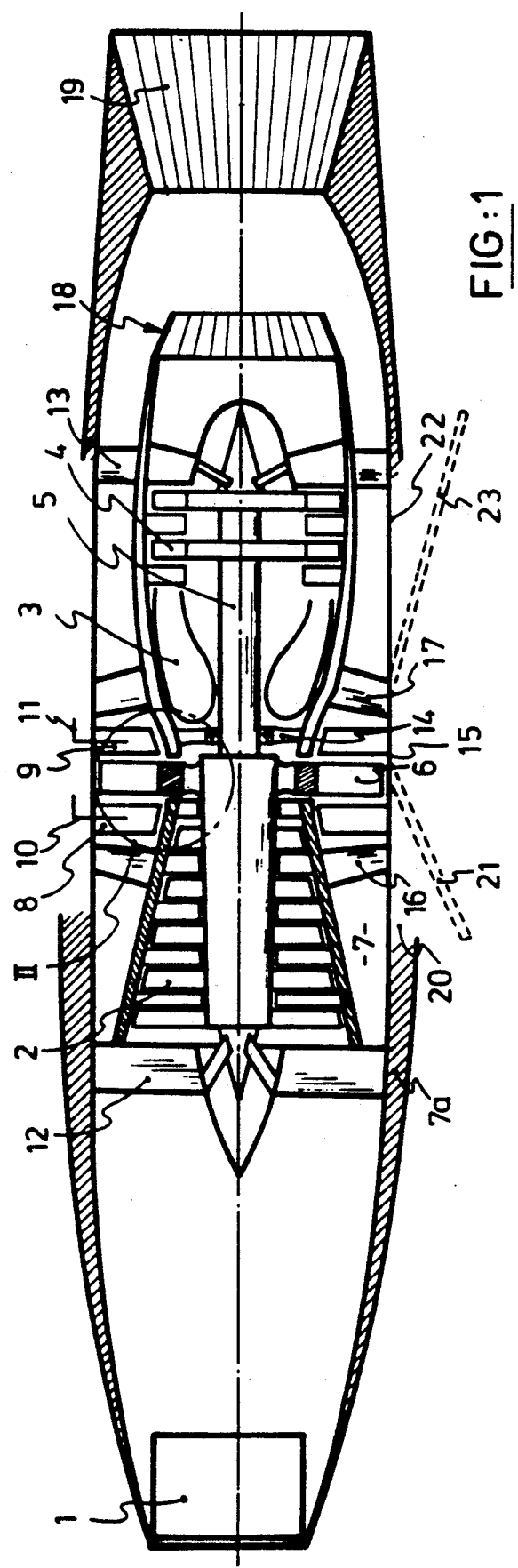
FIG. 1 is a diagrammatic sectional view, in a plane through its longitudinal axis of rotation, of one embodiment of a turbojet type propulsion engine in accordance with the invention.

A turbojet type propulsion engine intended primarily for supersonic aircraft and constructed in accordance with the invention is represented diagrammatically in FIG. 1. The engine comprises, starting from the upstream end with respect to the normal direction of flow of the gases through the engine, an air intake 1, and a primary unit including a compressor 2 of the multi-stage axial type, a combustion chamber 3, a turbine 4 which, in the example shown is also multi-staged, and an ejection nozzle 18 which is of adustable cross-section in a manner known per se. The casing of the primary unit is surrounded by an outer casing 7a to define between them a secondary duct 7 which is a cold flow duct.

The engine has a single rotary body carried by a shaft 5 which interconnects the compressor 2 and the turbine 4 of the primary unit and, in addition, carries the blades 6 of the rotor stage of a compression fan assembly which is disposed in the secondary duct 7 around the primary unit.

The shaft 5 is supported between the compressor and the turbine by bearings carried by arms connected to the casing of the primary unit.

Upstream of the rotor stage blades 6 in the secondary duct 7 the fan assembly has a stage of fixed vanes 8 forming an inlet guide, and downstream of the rotor blades 6 the fan assembly has a stage of fixed vanes 9 forming a flow straightener.

The fixed inlet guide vanes 8 and the fixed flow straightener vanes 9 are respectively associated with control devices, diagrammatically shown at 10 and 11 in FIG. 1, for adjusting the pitch of the vanes. These control devices may be of known construction, comprising one or more actuators and/or a control ring, the vanes 8 and 9 being mounted by means of suitable pivots permitting adjustment of their inclination relative to the main direction of the air flow through the secondary duct 7.

The outer casing 7a of the engine defines an upstream intake casing supported by radial structural arms 12, a downstream exhaust casing supported by radial structural arms 13, and an intermediate fan casing 15 supported by structural arms 16 upstream of the inlet guide vanes 8 and structural arms 17 downstream of the flow straightener vanes 9. At its downsteam end the exhaust casing is provided with exhaust nozzle 19 of adjustable section, as well as a thrust reverser device of known construction (not shown).

Although not essential, depending on the operational requirements of the engine, one of more additional air inlets, diagrammatically represented at 20 in FIG. 1, may be provided in the outer wall of the secondary duct 7 upstream of the fan assembly. These inlets 20 are fitted with a closure means, such as a gate 21 or a sliding ring, in a known manner. Similarly, one or more discharge outlets 22 may be provided in the outer wall of the secondary duct 7 downstream of the flow straightener vanes 9, the outlets 22 being provided in a known manner with closure means, such as gates 23, which also allows control of the sheets of the discharged flow when in the open position.

In the embodiment of the invention shown in FIG. 1, the fan assembly is located in line with the rear end of the compressor 2 and, in particular, the fan rotor blades 6 are arranged in line with the last stage of the compressor 2. The details of this arrangement are shown more clearly in FIG. 2. The blades 6 are mounted on an intermediate disc 24 surmounting a bladed part 25 which constitutes the last rotor stage of the compressor 2, and the connection of this assembly to the shaft 5 is effected by an inner part 26. The sealing requirements between the rotating parts and the adjacent fixed parts, both on the upstream side and on the downstream side, and at the inner side of the main flow path and at the dividing wall between main flow path and the secondary flow path, may be satisfied in any suitable known manner as indicated diagrammatically at 27.

FIG. 3 illustrates diagrammatically an embodiment of the invention in which each of the fixed vanes 8 and 9 of the inlet guide and the flow straightener respectively comprises three pivotally connected parts. In this case, each of the upstream vanes 8 has a fixed upstream part 8a which defines the leading edge 28 of the vane, an intermediate part 8b which is pivotally connected to the upstream part, and a downstream part 8c defining the trailing edge 29 of the vane and pivotally connected to the intermediate part 8b.

The two parts 8b and 8c are arranged to be pivoted in order to adjust their inclination under the control of the previously mentioned pitch control devices. Similarly, each of the downstream vanes 9 has a fixed downstream part 9a defining the trailing edge 30 of the vane, an intermediate part 9b which is pivotally connected to the downstream part, and an upstream part 9c which defines the leading edge 31 of the vane and is pivotally connected to the intermediate part 9b, the two parts 9b and 9c being arranged to pivot in order to adjust their inclination under the control of the previously mentioned pitch control devices.

The turbojet propulsion engine which has just been described with reference to FIGS. 1 to 3 is particularly suitable for supersonic aircraft, due in particular to its ability to operate in a variable cycle permitting operation which is best suited to the conditions, whether these are at supersonic flight or at subsonic flight.

In a supersonic flight operation pattern, the air inlets 20 are closed, as also are any discharge outlets 22. The fan operates at a low rate of output and compresses air coming from the main air intake 1 and flowing in the annular secondary duct 7.

FIG. 3 shows the configurations adopted in this case for the inlet guide vanes and the flow straightener vanes, the arrow 32 indicating the direction of rotation of the rotor blades 6 of the fan. The inlet guide vanes 8 are deformed by pivoting their parts 8b and 8c so as to guide the flow in the direction of the arrow 32 in the most efficient manner, the trailing edge parts assuming the positions 8C1 and 8C2 shown in FIG. 3. At the same time, the pivotable parts 9b and 9c of the flow straightener vanes 9 are moved in a direction opposite to that of the arrow 32, so that the leading edge parts of the vanes 9 assume the positions 9C1 and 9C2 shown in FIG. 3 in order to straighten the flow in the best possible manner.

On the other hand, in subsonic flight operation, particularly on take-off and during subsonic climb, and possibly during subsonic cruising conditions, or when descending or approaching, the air inlets 20 are open to supply additional air to the fan, which operates at full output when taking-off and climbing. In this case the inlet guide vanes 8 are adjusted so that their leading edges 28 and trailing edges 29 are aligned along a line parallel to the rotational axis of the engine, and the flow straightener vanes 9 are adjusted so that they adopt the configuration shown in full lines in FIG. 3, i.e. with the leading edge 31 slightly displaced from a line through the trailing edge 36 parallel to the engine axis.

Although the fan assembly comprising the inlet guide 8, the rotor 6 and the flow straightener 9, are situated in line with the downstream end of the compressor 2 in the example just described with reference to FIG. 1, it may be situated further upstream. FIG. 5 shows an example of such a construction in which the compressor includes an upstream portion 2a and a downstream portion 2b, and the fan rotor blades 6 are located in line with an intermediate stage 2c of the compressor.

Another alternative construction diagrammatically shown in FIG. 4 makes it possible to achieve single flow operation of the engine during supersonic cruising, i.e. with no air flow passing through the fan. For this purpose, bladders 32 and 33 are arranged in the secondary duct 7 respectively upstream of the fan inlet guide stage 8 and downstream of the flow straightener stage 9. Inflation of these bladders seals the secondary duct 7 to create a cavity 7b containing the fan assembly. A vacuum pump device 34 may also be provided to create a vacuum in the cavity 7b.

The propulsion engine in accordance with the invention, while ensuring that the desired performance is achieved in supersonic flight conditions, also makes it possible to reduce the level of noise and the consumption of fuel under subsonic flight conditions.

What is claimed is:

1. A variable cycle turbojet propulsion engine, particularly for supersonic aircraft, comprising:

a primary unit including a compressor, a combustion chamber, a turbine, a common shaft interconnecting said compressor and said turbine whereby said compressor is driven by said turbine, and an exhaust assembly having at least one adjustable section nozzle, an annular outer casing surrounding said primary unit and defining therebetween an annular cold flow secondary duct, an air intake at the upstream end of said outer casing, a secondary adjustable section exhaust nozzle at the downstream end of the said outer casing, and a compression fan assembly disposed in said secondary duct, said fan assembly including at least one stage of movable rotor blades rigidly connected to said shaft of said primary unit so as to be driven thereby, a stage of fixed inlet guide vanes on the upstream side of said rotor blade stage, a stage of fixed flow straightener vanes on the downstream side of said rotor blade stage, a first adjuster for adjusting the pitch of said inlet guide vanes, and a second adjuster for adjusting the pitch of said fixed flow straightener vanes.

2. A propulsion engine according to claim 1, wherein said fan assembly is located in line with the downstream end of the said compressor, said rotor blade stage of said fan assembly being situated in a transverse plane passing through the final stage of said compressor.

3. A propulsion engine according to claim 1, wherein said fan assembly is located in an intermediate position with respect to the upstream and downstream ends of said compressor, said rotor blade stage of said fan assembly being situated in a transverse plane passing through an intermediate stage of said compressor.

4. A propulsion engine according to claim 1 wherein each inlet guide vane of said fan assembly includes three parts comprising a fixed upstream part defining a leading edge, and two downstream parts pivotable in an articulated manner so as to adjust their inclination relative to the normal direction of the air flow in said secondary duct, and wherein each flow straightener vane of said fan assembly includes three parts comprising a fixed downstream part defining a trailing edge, and two upstream parts pivotable in an articulated manner so as to adjust their inclination relative to the normal direction of the air flow in said secondary duct.

5. A propulsion engine according to claim 1, wherein said outer casing includes at least one peripheral air inlet for said secondary duct upstream of said fan assembly, and a mechanism for effecting a temporary closure of said peripheral air inlet.

6. A propulsion engine according to claim 1, wherein said outer casing includes at least one peripheral air discharge outlet from said secondary duct downstream of said fan assembly, and a mechanism for effecting temporary closure of said discharge outlet.

7. A propulsion engine according to claim 1, including an inflatable bladder in said secondary duct both upstream and downstream of said fan assembly, and an evacuating mechanism for evacuating a part of said secondary duct between said bladder means and containing the fan assembly when each said bladder is inflated.

* * * * *